Patented Apr. 15, 1941

2,238,180

UNITED STATES PATENT OFFICE 2,238,180

PROCESS FOR THE INTRAMOLECULAR DE-HYDROGENATION OF AROMATIC RING SYSTEMS

Eduard Moergeli, Neue Welt, near Basel, Karl Krauer, Basel, and Max Bommer, Riehen, Switzerland, assignors to the firm Society of Chemical Industry in Basle, Basel, Switzerland No Drawing. Application July 20, 1938, Serial No. 220,402. In Switzerland July 23, 1937

5 Claims. (Cl. 260—352)

By the designation "Scholl reaction" a process has become known according to which aromatic nuclei are linked together with aid of aluminium chloride while splitting off aromatically bound hydrogen. Reference is made in this connection to Scholl and Seer, Liebig's Annalen, vol. 394, page 111 (1912) and to pages 30–35 of Georg Kränzlein, "Aluminiumchlorid in der organischen Chemie" published by "Chemie," Berlin. This process is advantageously carried out by using hydrogen acceptors. These may essentially accelerate the course of the reaction and increase the yield. If the aluminium chloride fusion is conducted in the presence of oxygen as hydrogen acceptor, good yields are obtained only when the gas is intensively distributed in the hot melt. A satisfactory distribution of gas, however, involves great difficulty on a large scale and necessitates specially constructed apparatus. Difficulties which are not without importance also arise owing to the greatly increased sublimation of aluminium chloride in the current of oxygen. If instead of oxygen other hydrogen acceptors are used, for instance potassium permanganate, manganese dioxide, lead peroxide, cerium dioxide, vanadium pentoxide, arsenic pentoxide, barium peroxide, ferric oxide, ferric chloride, cupric oxide, mercuric oxide, sodium nitrite, sodium nitrate, sulfur or selenium, the technical conduct of the process is extraordinarily simplified but at the same time the yields obtainable in the presence of oxygen are no longer achieved. Moreover, the purity of the final product when such oxidizing agents are used leaves much to be desired, because the hydrogen chloride which is produced in the fusion is decomposed, whereby the halogenating effect generally occurring in such reactions is much favoured. This halogenation is still more intensive when products such as chlorine, bromine or sulfuryl chloride are used as hydrogen acceptors.

This invention relates to a process of this kind in which there are used as hydrogen acceptors nitro-compounds having in addition to the nitro-group at least one other negative substituent, for instance a nitro-, sulfo- or hydroxy-group. In comparison with the use of oxygen, such nitro-compounds, in consequence of their solubility in the fused mass, shorten to a strong degree the duration of the reaction and at the same time permit the fusion to be effected in apparatus of simple construction. As compared with the use of the other inorganic acceptors, nitro-compounds permit the production of the final products in good yield, even approximately quantitative, and halogenations are avoided as far as possible. Suitable hydrogen acceptors for use in this invention are, for instance, meta-dinitrobenzene, meta-nitrobenzenesulfonic acid, picric acid, dinitronaphthalenes, nitronaphthalene - sulfonic acids, nitrochloronaphthalenes, nitroanthracenesulfonic acids, dinitroanthracenes and the like. The invention is of value in all products with which the Scholl reaction, with formation of aromatic six-membered carbon rings, leads on principle also to the desired result. The process is particularly advantageous when applied to compounds containing ketone-groups. It may therefore be used for example in the synthesis of the dibenzpyrenequinones from 1:5-dibenzoylnaphthalene or from Bz 1-benzoylbenzanthrone, of pyranthrone, of naphtho- and anthradianthrone, of benzanthrone, of phenanthrenequinone, of violanthrone and isoviolanthrone and derivatives of these products, further in the synthesis of perylene and derivatives thereof, and the like.

The following examples illustrate the invention, the parts being by weight:

Example 1

To a molten mass capable of being stirred, consisting of 242 parts of aluminium chloride and 58 parts of sodium chloride at a temperature of 160–165° C. there are added 20 parts of 1:5-dibenzoylnaphthalene and then in the course of 4 hours 13 parts of meta-dinitrobenzene in small portions. The blue mass is then decomposed with water and the organic material is freed from aluminium chloride by extraction with boiling dilute hydrochloric acid. From the reaction material there is obtained in approximately quantitative yield by vatting the 3:4:8:9-dibenzpyrenequinone-5:10.

Example 2

20 parts of 1:5-dibenzoylnaphthalene are introduced into a melt of 300 parts of sodium-aluminium chloride at 160–165° C. and there are then added in the course of 4 hours in small portions 19 parts of sodium meta-nitrobenzenesulfonate. After stirring for 2 hours at the same temperature the mass is decomposed with water and extracted with boiling dilute hydrochloric acid. After vatting the remaining product there is obtained 3:4:8:9-dibenzpyrenequinone-5:10 in a yield of 80–90 per cent of the theoretical.

Example 3

Into a mixture of 30 parts of benzanthrone and 56 parts of benzoyl chloride there are introduced at a temperature below 100° C. 300 parts of aluminium chloride. The whole is stirred for one hour at 145–150° C. and there are then added in the course of 8 hours 19 parts of sodium meta-nitrobenzenesulfonate, and stirring is continued for a further hour at the same temperature. After the usual working up, the product is treated with sodium hypochlorite solution until the yellow-brown color has passed to a brilliant orange. The product dissolves in concentrated sulfuric acid to a carmine solution having a brilliant moss green fluorescence. This latter arises from impurities and is removed by extraction with benzene. There is thus obtained in quite good yield 3:4:8:9-dibenzpyrenequinone-5:10.

Example 4

40 parts of tetrabenzoylpyrene (obtainable by heating to boiling for 3 hours a mixture of 1 part of pyrene, 5 parts of acetylene tetrachloride, 4 parts of benzoyl chloride and 0.5 part of sublimed ferric chloride) are dissolved in a melt of 600 parts of sodium-aluminium chloride at 125–150° C. There is then added carefully to the melt 52 parts of meta-dinitro-benzene. The mass is stirred until it has acquired a violet color. The melt is then worked up in the usual manner and the dyestuff produced is purified by vatting. There is obtained in good yield a brown-yellow powder soluble in concentrated sulfuric acid to a red-violet solution and dyeing cotton yellow tints.

Example 5

Into a mixture of 60–80° C. consisting of 210 parts of aluminium chloride and 56 parts of benzoyl chloride there are introduced while stirring 30 parts of benzanthrone. The whole is stirred for 1 hour at 150° C. and 10 parts of picric acid are added in small portions in the course of 5 hours. When the formation of dyestuff is complete the fusion is worked up analogously as in Example 3. The yield of the dyestuff amounts to over 70 per cent of the theoretical.

What we claim is:

1. Process for the intramolecular dehydrogenation of aromatic ring systems by means of aluminium chloride according to the Scholl reaction with aid of hydrogen acceptors, comprising using as hydrogen acceptor aromatic nitro-compounds which in addition to the nuclearly bound nitro-group contain at least one other negative substituent.

2. Process for the intramolecular dehydrogenation of aromatic ring systems by means of aluminium chloride according to the Scholl reaction with aid of hydrogen acceptors, comprising using as hydrogen acceptor aromatic nitro-compounds of the benzene series which in addition to the nuclearly bound nitro-group contain at least one other negative substituent.

3. Process for the intramolecular dehydrogenation of aromatic ring systems by means of aluminium chloride according to the Scholl reaction with aid of hydrogen acceptors, comprising using as hydrogen acceptor aromatic nitro-compounds of the benzene series which in addition to the nuclearly bound nitro-group contain a sulfo-group.

4. Process for the intramolecular dehydrogenation of aromatic ring systems by means of aluminium chloride according to the Scholl reaction with aid of hydrogen acceptors, comprising using as hydrogen acceptor nitrobenzene-meta-sulfonic acid.

5. Process for the intramolecular dehydrogenation of aromatic ring systems by means of aluminium chloride according to the Scholl reaction with aid of hydrogen acceptors, comprising using as hydrogen acceptor 2:4:6-trinitro-1-hydroxybenzene.

EDUARD MOERGELI.
KARL KRAUER.
MAX BOMMER.